M. H. SHOENBERG.

ELECTRICAL WATER HEATER.

APPLICATION FILED JAN. 10, 1912.

Reissued Oct. 15, 1912.

13,480.

WITNESSES

N. B. Keating

Leon Boillot

INVENTOR

Milton H. Shoenberg,

BY

Jno. Wright,

ATTORNEY.

UNITED STATES PATENT OFFICE.

MILTON H. SHOENBERG, OF SAN FRANCISCO, CALIFORNIA, ASSIGNOR, BY MESNE ASSIGNMENTS, TO THE THERMO ELECTRIC COMPANY, OF SAN FRANCISCO, CALIFORNIA, A CORPORATION OF CALIFORNIA.

ELECTRICAL WATER-HEATER.

13,480. Specification of Reissued Letters Patent. Reissued Oct. 15, 1912.

Original No. 1,005,754, dated October 10, 1911, Serial No. 624,017. Application for reissue filed January 10, 1912. Serial No. 670,509.

*To all whom it may concern:*

Be it known that I, MILTON H. SHOENBERG, a citizen of the United States, residing at San Francisco, in the county of San Francisco and State of California, have invented new and useful Improvements in Electrical Water-Heaters, of which the following is a specification.

My invention relates to certain new and useful improvements in fluid-heaters, and more particularly to that class of apparatus wherein water is heated through the medium of an electric current, and may be rapidly heated, almost instantaneously in fact, to any desired degree as it flows through a delivery-pipe to the point of discharge. In apparatus of this character, there is danger of overheating or burning out the heater elements in case the electric current should be switched onto the apparatus when the water is not flowing.

It is the purpose of my invention to provide means for insuring a flow of water through the heater whenever the electric circuit is completed, and to prevent cutting off the water supply while the electric current is on.

Another object is to prevent any electrolysis between the parts of the apparatus or a difference of electrical potential between the exposed parts.

A further object is to construct an apparatus in which the fluid channels and the heater elements shall be readily accessible for inspection and repair.

Figure 1:
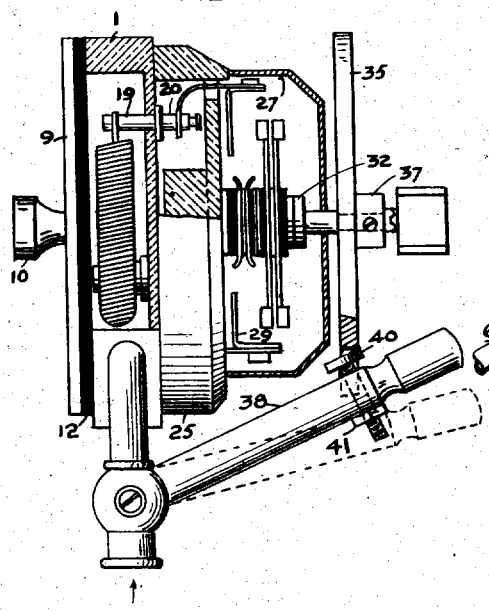
Figure 2:
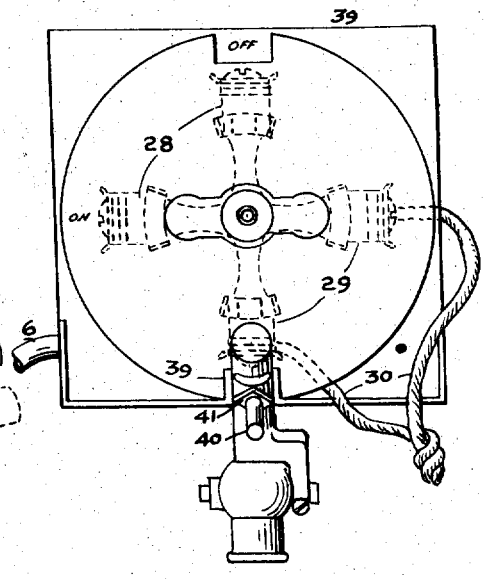
Figure 3:
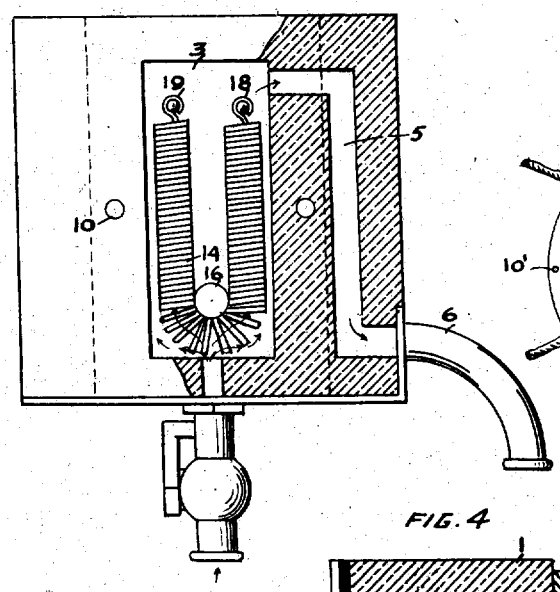
Figure 5:
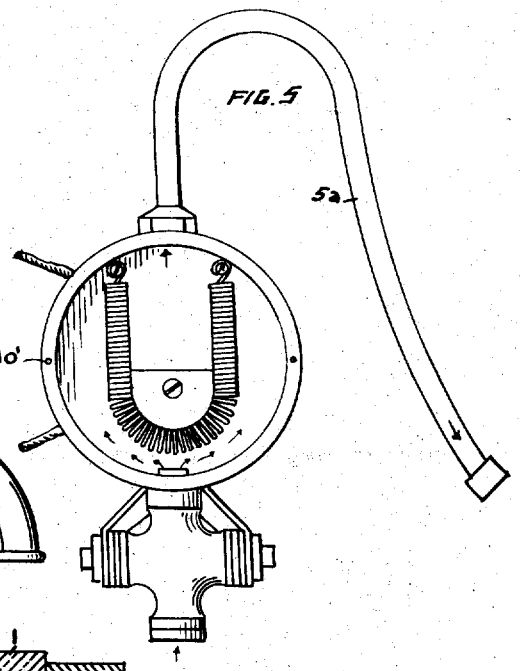
Figure 4:
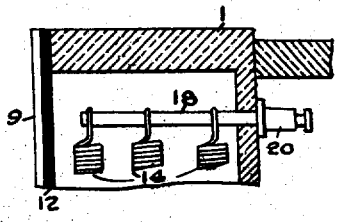

Other objects will be apparent from the following description in connection with the accompanying drawings, in which, Figure 1 is a vertical section of an apparatus embodying my invention; Fig. 2 is a front elevation of the same showing the switch turned off and the water valve closed, the electrical connections being indicated in dotted lines; Fig. 3 is a rear elevation with the cover plate removed and partly in section; Fig. 4 is a fragmentary sectional view of the heating chamber, showing a plurality of heater elements; and Fig. 5 is a rear elevation of a modified form of apparatus with the cover plate removed.

The heater casing 1, illustrated in Figs. 1, 2, and 3, may be constructed of porcelain, metal, or other suitable material, and is provided with a heating chamber 3 and a discharge channel 5, which is preferably connected to the top of the heating chamber and is conducted through the body or wall of the casing to a discharge opening near the bottom to which a faucet or spout 6 is fastened. By carrying the discharge channel through the wall of the casing, I am enabled to effectively prevent any electrolysis between the inlet and outlet of the heater. To avoid the possibility of any difference of electrical potential between the external metal parts, I may connect the discharge spout 6 with the inlet pipe by means of a metal plate 7, thus avoiding the possibility of shock.

In water heaters it is not only desirable to have access to every part of the heating chamber, but it is important that the electric heating elements should be easily exposed for inspection or be readily removed and replaced when damaged. In my apparatus every part of the heating chamber is exposed by simply removing the cover plate 9, which is held in place by two or more screws 10, a gasket 12 insuring a tight joint. When the water chamber is exposed as shown in Fig. 3, the heating coils 14 are entirely exposed and may be thoroughly inspected without removing them from their supports in the chamber. I have found that these heating elements or coils are much more efficient when disposed longitudinally of the flow of water and are so placed that the water currents pass directly through the coils. I accomplish these purposes by bending the coil about an insulating knob or button 16, which opens or spreads the spirals at the bend or bight, permitting the water to pass easily through the interior of the coils. The end loops of the coils are placed over contact bars 18, 19, secured to binding posts 20, to which the switch contacts are connected. The length of the heating coils is such that when they are mounted in position, they will be held under a certain amount of tension and will thus maintain good electrical contact with the bars 18 and 19. By threading a plurality of coils in parallel upon the contact bars, in the manner illustrated in Fig. 4, I can increase the heating capacity of the apparatus, and by changing the number of the coils I can vary or adjust the capacity to suit different conditions and regulate the degree of heat. The several advantages derived from this manner of mounting the heater-elements into U-shaped coils will now be apparent. In addition to the special advantages above mentioned, I am enabled to secure a very compact device, the two ends or arms of the coil being closely associated in the same chamber, reducing the exterior surface of the casing to a minimum and concentrating the water-heating surfaces. By returning the discharge channel 5 through the casing, I do not only avoid the possibility of electrolysis but conserve the heat which passes through the intermediate wall between the channel and the heating chamber, thus reducing the radiation losses both from the chamber and from the channel. The arrangement is so simple, that anyone can introduce or replace the coils, the act of bending the loop around the button 16 serving to automatically spread the convolutions of spirals at the bight adjacent to the water inlet, so that the services of a skilled mechanic are unnecessary.

Upon the front of the casing is mounted a snap-switch having a base 25, provided with recesses to receive the binding posts 20 or connecting devices attached to the contact bars 18 and 19. An outer removable shell 27 protects the sets of contacts 28, connected with the heater coils, and 29, connected with the leads 30 from the supply wires. The rotary stem 32 carries pairs of switch blades, which are brought into engagement with said sets of contacts in one position and are disengaged therefrom in another position.

An ordinary snap-switch such as is now in common use may be attached to my heater, the proper electrical connections being made with the contact bars which support the heater-coils. For the purpose of guarding against the possibility of burning out the heater-coils by turning on the current when the water is shut off from the water-chamber, I provide an auxiliary guard or safety lock-plate 35, having a central opening which may be placed over the stem of any ordinary snap-switch and secured in position by means of a collar 37 screwed or otherwise fastened to the stem. The periphery of the guard or lock-plate projects into the path of the water-valve handle 38, so that it will normally be prevented from moving to the closed position by striking the edge of the plate as indicated in dotted lines in Fig. 1, and can only be turned to fully shut off the water valve when the switch is in the "off" position with the electric current cut off, in which position one of the notches 39 is brought into alinement with the lever handle 38, so that it may be forced back into the recess to entirely shut off the water. In order to adjust the valve handle with respect to the guard-plate to vary the position of the water valve when the handle is against the plate and thus graduate the minimum stream of water which shall flow through the heater chamber when the electric current is on, and also to adjust the exact position of the handle when it is forced back within the recess 39, I attach a regulating screw or other adjustable device 40, to the handle. After the proper adjustment has been made, the parts may be locked in position by means of a lock-nut 41.

Before the switch can be turned to close the electric circuit, it is first necessary to pull the lever handle 38 until it is disengaged from the notch 39 in which it lies when the cock is closed, and as soon as it is pulled down far enough to allow the disk on the switch stem to be turned, the cock will open sufficiently to permit a flow of water through the heating chamber and the heating element or coil will be submerged and protected from injury. The heating coil may be made of bare wire, or it may be a wire thinly coated with a substance which will not be sufficient to interfere with its heat conductivity. If it is desired to draw cold water only, the lever may be pulled down to open the cock without closing the switch, and when it is desired to draw hot water, the switch is turned to the closed or "on" position as previously described.

By pulling down the lever handle 38 still farther, beyond that which is necessary to disengage it from the notch 39, the flow of water may be increased proportionately to the angle through which the handle 38 is so pulled, and, since the current of electricity is not thereby affected, the temperature of the water may be varied as desired. This result I believe to be novel in electric water heaters.

A serious objection to the use of electric water heaters for domestic purposes has heretofore been the annoyance, trouble, and expense occasioned when the heating coils burn out, which must occur within a period of greater or less duration depending upon the extent to which they are subjected to electrolysis. With all prior construction, so far as I am aware, the replacement of the heating coils, when burned out, has required the services of an electrician. My invention is so constructed as to permit of this replacement being made by a person of no electrical skill or experience, and of very ordinary intelligence, it being only necessary to unscrew the screws 10 (which are made with large heads so that they can be turned by the fingers without requiring a screw driver), remove the cover plate 9, lift the ends of the coil from the contact bars 18, 19, replace a new coil in the same position on said contact bars, and then replace the cover. By reason of the terminal loops of the coil, when the latter surrounds the insulating knob or button 16, being firmly held on said contact bars under the tension of the coiled spring, it is not necessary to employ special devices in order to obtain good electrical contacts between said coil and contact bars.

The above construction, therefore, permitting of the heating coils being removed from, and replaced in, position and of the heating chamber being opened and closed easily, without the use of tools, and in a very short space of time, obviates the principal disadvantages heretofore attendant upon the use of electrical water heaters, especially as the coils themselves can be made and sold at a nominal cost.

I am aware that changes may be made in the structure of the apparatus which has been shown herein for the purpose of illustrating an embodiment of my invention, such as will occur to those skilled in this art, and I desire to cover the same in the appended claims.

I claim:—

1. An electric fluid heater comprising a casing having a heating chamber provided with inlet and outlet passages, supporting bars in one end of said chamber and an insulating stud at the other end, a heater element having its ends secured respectively to said bars and its intermediate portion bent around said stud, an electric switch having contacts connected with said bars and cooperating contact members carried by a rotary stem, a guard or locking-plate carried by said stem having notches in its periphery, and a valve in said inlet passage having a handle adapted to enter one of said notches when in the closed position.

2. An electric fluid heater comprising a casing having a heating chamber provided with inlet and outlet passages, supporting bars in one end of said chamber and an insulating stud at the other end, a heater element having its ends secured respectively to said bars and its intermediate portion bent around said stud, an electric switch having contacts connected with said bars and coöperating contact members carried by a rotary stem, a guard or locking plate carried by said stem having notches in its periphery, a valve in said inlet passage having a handle adapted to enter one of said notches when in the closed position, and an adjusting device upon said handle adapted to regulate the approach thereof with respect to the periphery of said plate.

3. An electric heater comprising a casing having a heating chamber provided with inlet and outlet openings, electric heating coils in said chamber, a metal supply cock connected with said inlet, a metal discharge pipe with said outlet, and a short-circuiting plate fixed to the casing and connecting said metal parts.

4. An electric water heater comprising a casing having a heating chamber provided at opposite ends with inlet and outlet openings respectively, insulated supporting bars located near one end of said chamber and an insulating stud near the opposite end thereof, a U-shaped heating coil having its ends detachably connected to said bars and its bight passing around said stud, the inlet opening being located below said bight whereby water passing through the chamber may traverse the interior of the coil and also surround its exterior.

5. An electric water heater comprising a casing provided with a recess forming a heating chamber having a side cover plate which may be removed to give ready access to the entire chamber, contact bars located near one end of said chamber and an insulating support near the opposite end thereof, and U-shaped spiral heating coils within said chamber and having their ends detachably connected to said contact bars and their intermediate portions supported upon said insulating support.

6. An electric water heater comprising a casing provided with a recess forming a heating chamber having a side cover plate which may be removed to give ready access to the entire chamber, conducting contact bars projecting within one end of said chamber and an insulating support projecting within the opposite end thereof, and U-shaped spiral heating coils within said chamber and having their ends detachably connected to said contact bars and their intermediate portions supported upon said insulating support.

7. An electric water heater comprising a casing having a heating chamber provided with inlet and discharge passages, said discharge passage being connected with one end of said chamber and passing through the body of the casing parallel with and adjacent to the chamber throughout its length, and having an outlet opposite the inlet end thereof, electric heating coils supported within said chamber, and switch contacts connected with the terminals of said coils.

8. An electric water heater comprising a casing having a heating chamber provided with inlet and discharge openings, heating coils supported within said chamber, a rotary switch having contacts connected with the terminals of said coils, a disk detachably connected to said switch and rotatable therewith and having recesses upon its periphery, a water valve connected with said inlet, a controlling lever for said valve adapted to swing into one of said notches to lock the switch when the water supply is cut off, and an adjustable gage on said lever to engage said disk and regulate the minimum flow of water when the electric switch is in the closed or "on" position.

9. In combination with a heating chamber casing open on one vertical side, contact bars extending each at one end from the opposite side of said chamber, the other ends being free and directed toward said first-named side, a coiled spring under tension at both ends and having at its ends loops surrounding said contact bars and adapted to be passed over their free ends, a cover plate closing said open side, a gasket between the cover plate and the wall of the chamber, and a screw passing through said cover plate and screwed into the wall of said chamber, said screw having a large head adapted to be manually held and turned.

10. In combination with a casing of a heating chamber adapted to be opened on one side only, and having independent water inlet and outlet conduits therethrough, contact bars each extending at one end from said casing, the other ends being free and directed toward said side, a high-resistance wire detachably connected at its ends to said contact bars, and removable means for closing said open side of the chamber.

11. In combination with a casing of a heating chamber adapted to be opened on one side, and having independent water inlet and outlet conduits therethrough, contact bars each extending at one end from the opposite side of said casing, the other ends being free, a high-resistance wire having at its ends loops surrounding said contact bars, and removable means for closing said open side of the chamber.

12. In combination with a casing of a heating chamber open on one side, and having independent water inlet and outlet conduits therethrough, contact bars each extending at one end from the opposite side of said chamber, and adapted to be connected outside said chamber with conductors for supplying electric current, the other ends being free, a coil of high resistance spring wire having at its ends loops of sufficient size to pass over the free ends of the bars, and removable means for closing said open side of the chamber.

13. In combination with a casing of a heating chamber adapted to be opened on one side only, and having independent water inlet and outlet conduits therethrough, contact bars each extending at one end from the opposite side of said chamber, and adapted to be connected outside said chamber with conductors for supplying electric current, the other ends being free, a coil of high resistance spring wire having at its ends loops of sufficient size to pass over the free ends of the bars, said wire being held on said bars by its spring tension, and removable means for closing said open side of the chamber.

14. In combination with a casing of a heating chamber open on one side only, and having independent water inlet and outlet conduits therethrough, contact bars each extending at one end from said casing, the other ends being free and directed toward said first-named side, a coiled high-resistance spring wire under tension at both ends and having at its ends loops surrounding said contact bars and held by said tension thereon, and adapted to be passed over their free ends, and removable means for closing said open side of the chamber.

15. In an electric water heater, the combination with a switch for controlling the electric current, a valve for controlling the water current, and permitting said current to flow in quantity corresponding to the angle through which said valve is turned, means for preventing the closing of said switch, means whereby said preventive means is rendered operative when said valve is closed, or is opened less than a predetermined extent, said means being arranged to be inoperative when said valve is opened to more than said extent.

MILTON H. SHOENBERG.

Witnesses:

FRANCIS M. WRIGHT,
N. B. KEATING.

Copies of this patent may be obtained for five cents each, by addressing the "Commissioner of Patents, Washington, D. C."